United States Patent [19]

Tang

[11] Patent Number: 4,705,716

[45] Date of Patent: Nov. 10, 1987

[54] INTEGRAL CAR BODY MADE OF COMPOSITE MATERIAL

[76] Inventor: Jinsheng Tang, Zhonghua Automobile Manufacturing Corporation, Shenzhen, Guangdong Province, China

[21] Appl. No.: 846,864

[22] Filed: Apr. 1, 1986

[30] Foreign Application Priority Data

Apr. 1, 1985 [CN] China .................................. 85200688

[51] Int. Cl.⁴ ........................... B32B 3/26; B32B 5/18; B32B 17/04
[52] U.S. Cl. .................................. 428/251; 428/304.4; 428/319.1; 428/319.3; 428/332; 428/415; 428/417; 428/430
[58] Field of Search ............ 428/213, 215, 251, 304.4, 428/319.1, 319.3, 415, 417, 430, 431, 332

[56] References Cited

U.S. PATENT DOCUMENTS

| | | | |
|---|---|---|---|
| 3,080,267 | 3/1963 | Schmalz | 428/319.3 |
| 3,158,529 | 11/1964 | Robitschek et al. | 428/319.3 |
| 4,539,253 | 9/1985 | Hirschbushler et al. | 428/251 |
| 4,601,944 | 7/1986 | Zussman | 428/251 |

FOREIGN PATENT DOCUMENTS

| | | | |
|---|---|---|---|
| 1172419 | 6/1964 | Fed. Rep. of Germany | 428/319.3 |
| 1353325 | 1/1964 | France | 428/319.3 |
| 53-49830 | 5/1978 | Japan | 428/319.3 |

*Primary Examiner*—William J. Van Balen
*Attorney, Agent, or Firm*—Michael N. Meller

[57] ABSTRACT

A light weight, high strength composite material which is particularly suitable for making an integral car body. An inner mold is made according to the required configuration with foam composite material. At least one layer of glass fiber cloth soaked with epoxy resin and at least two layers of glass fiber cloth soaked with polyester are successively used to wrap the inner mold with overlap. The surface is processed after solidification. Thus a required composite material car body is made.

11 Claims, 4 Drawing Figures

FIG.3
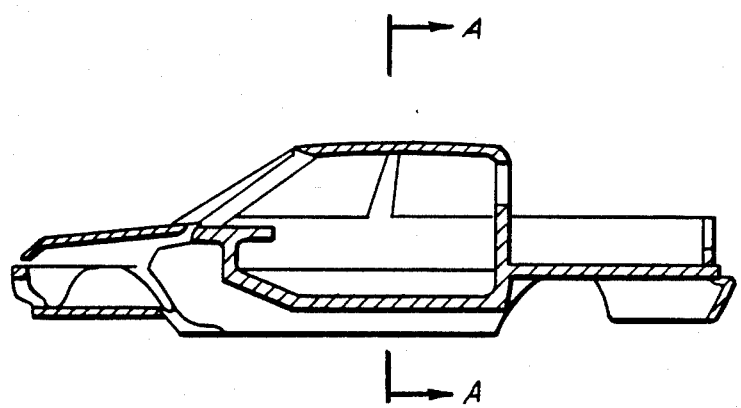
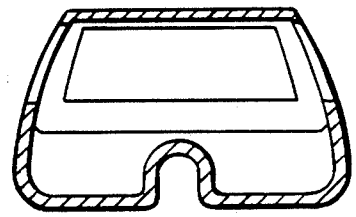
FIG.4

INTEGRAL CAR BODY MADE OF COMPOSITE MATERIAL

The present invention relates to a high-strength, light-weight composite material car body and its manufacturing method, particularly, it relates to an integral car body made of composite material, i.e. the commonly called full plastic car body, and its manufacturing method.

A car body is generally made of steel plate by stamping. In recent years with rapid development of composite engineering materials there are more and more cases of applying composite material to manufacture car elements, for example, the steering wheel, the instrument panel, the doorpost, the top ceiling etc. are being made of semi-hard polyurethane foam plastic and polychloride; the bumper is being made of modified hard polyurethane plastic; the cover plate is being made of modified ABS plastic; the door is being made of SMC laminated plastic; the spring plate and pivoted shaft are being made of carbon fiber glass-reinforced plastic and so forth; there are also cases of making an integral car body of composite material, but due to high material cost and complexity of manufacturing there has not been a car body made of composite material introduced into the market to date. The main reasons are twofold: 1. In general, a car body made of composite material is not adequate in terms of strength and impact resistance features; 2. Its cost is higher than that of a car made of steel. In view of the above mentioned two reasons, despite the fact that an integral car body made of composite material has advantages of light weight, low energy consumption etc., it still cannot be put into mass production to replace steel.

The objective of the present invention is to provide a lightweight and high-strength composite material, which can be used to make an integral car body. Such an integral car body not only has high strength and light weight, but also is durable. Its cost is much lower than that of steel, thus it is possible to make an integral car body of composite material in mass production. In addition, the present invention provides a method of making such material.

The main content of the present invention includes: a car body made of composite material, which is made by separately using at least one layer of fiber glass cloth soaked with epoxy resin and at least two layers of fiber glass coth soaked with polyester to fully wrap a car inner mold made of composite foam material, and its manufacturing method.

The present invention mainly employs the high moment of inertia principle in mechanics of material, and performs a prestressed treatment so that the car body may obtain the above-mentioned advantages.

As is well known, $$J_2 = \frac{bh^3}{12},$$

wherein $J_z$ is the moment of inertia of the material, b is the width of the material, h is the thickness of the material (see FIG. 1). From the equation it can be seen that $J_z$ increases in cubic proportion with increase in the thickness of the material, therefore it is desirable to have thicker material. Obviously, the moment of inertia of the material may be increased by using glass fiber, that is, by sandwiching foam plastic between glass fiber-reinforced plastic. At the same time the bend resistant stiffness D may also be increased in great degree, which can also be seen from the equation $$D_2 \simeq E_g \frac{b(H^3 - h^3)}{12} + E_f \frac{b(H^3 - h^3)}{12}$$

wherein Eg is the modulus of elasticity of glass, $E_f$ is the modulus of elasticity of foam, H is the total thickness of material, h is the thickness of sandwiched foam. Due to the effect of a high moment of inertia, glass fiber cloth sandwiched with foam plastic has very high strength. However, its features have not been fully employed yet, because the best feature of glass fiber-reinforced plastic lies in its stretching resistance ($\sigma_s = 250$ kg/cm$^2$). Moreover, glass fiber-reinforced plastic soaked with epoxy resin or polyester may contract by eight thousandths during the process of solidification. Ingeniously employing these two great features of glass fiber-reinforced plastic will make it prestressed, thus a material with higher stiffness is obtained, and it is possible then to reduce its cost and extend its service life.

A more detailed description of the present invention is given below with reference to the attached drawings.

FIG. 3 is a schematic drawing of a sectional view of a car body made of composite material.

FIG. 4 is a sectional view of the car of FIG. 3 taken along line A—A.

Figure 1:
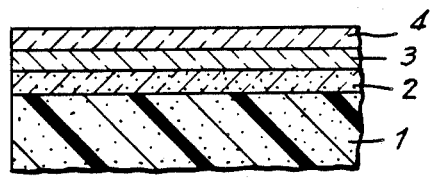
FIG. 1 is a schematic drawing of a local sectional view of the composite material made by one method.

The glass fiber cloth to be used, such as 2, 3, 4 in FIG. 1, is generally neutral, dewaxed, and not too thick, generally speaking, the thickness should be in the range of 0.1 to 0.5 mm, preferably 0.25 mm.

Figure 2:
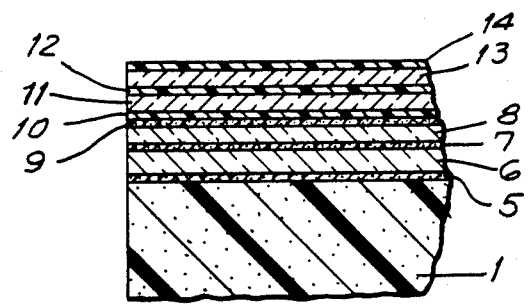
FIG. 2 is a schematic drawing of a local sectional view of composite material made by a second method.

The composite foam material, such as 1 in FIG. 1 and FIG. 2, (i.e. the material to be used for making the inner mold) needs to be both lightweight and easy to manufacture. The foam material should have elasticity and should be low in price. In general, polystyrene foam plate or hard polyurethane foam can be used, the volume weight of which may be about 25 kg/m$^3$.

The thickness of the composite foam material may vary depending on the application. Generally speaking, the thickness is within the range 10 to 500 mm. In most cases, a thickness of about 50 mm is sufficient.

The method for manufacturing the composite material car body according to the invention is as follows.

First of all, composite foam material is used to make an inner mold to the required configuration (see FIG. 3 and FIG. 4). In lot size production, foam plate can be processed to make various components of required configuration first according to the method of making wood mold and then sticking various components together with adhesive to form the required integral configuration. In mass production injection molding can be used to form the required configuration at once.

In the next step this inner mold is wrapped fully and layer by layer with glass fiber cloth.

Glass fiber cloth is to be cut properly to match the corresponding inner mold. Then it is soaked in a solution of epoxy resin, wherein the epoxy resin should be diluted, and at the same time a solidifying agent should be added to said solution. If ethylenediamine is used as the solidifying agent, then a proportion of about 1:10 between ethylenediamine and epoxy resin is acceptable.

A glass fiber cloth soaked with epoxy resin (layer 2 in FIG. 1) is applied to cover the inner mold. By means of a hard brush having a width of more than 6 cm, the glass fiber cloth is brushed flat. The first layer of glass fiber must fully and evenly wrap the inner mold, and particular attention should be paid to overlapping part of the glass cloth. The width of the overlapping part should not be less than 50 mm to ensure its strength. After about 3 hours the semi-solidified glass fiber cloth is evenly rolled and pressed by a rubber drum to obtain a plain surface. This surface is then covered with at least one layer of such glass fiber cloth soaked with epoxy resin. If two layers are needed to cover the mold, then the second covering layer should be put on approximately 36 hours after the first layer covering. i.e. after solidification of the glass fiber reinforced plastic.

The glass fiber cloth, properly cut and soaked with polyester (layer 3 in FIG. 1) is fully and evenly wrapped on the first layer (or several layers) of glass fiber cloth with overlap according to said method. Again the overlapping width should not be less than 50 mm. Glass fiber cloth soaked with polyester is to be wrapped in at least two layers. As shown in FIG. 1, numeral 4 denotes the second layer. Approximately another 48 hours after the last layer has been wrapped on, glass fiber-reinforced plastic with polyester resin is solidified, then its surface is polished, painted and shined. The polyester used here should be mixed with a certain amount of catalyst.

The above steps constitute the first method of making composite material. The second method is similar to the first. The main difference is as follows: first of all, prepared epoxy resin (layer 5 in FIG. 2) is evenly sprayed or brushed on a foam inner mold 1, where a solidifying agent is also added to the epoxy resin. After about 20 minutes, when the epoxy resin is still quite sticky, both ends of the first layer of glass fiber cloth 6 are pulled flat, smoothly put on foam inner mold 1; and brushed plain with a dry brush. Then the mold is quickly completely wrapped with glass fiber cloth, where the cross overlap between each cloth is also at least 50 mm. Next, the solution of epoxy resin is again sprayed or brushed on the first layer 6 of glass fiber cloth (layer 7 shown in FIG. 2), in order to soak the glass fiber cloth layer 6 with said solution. About 20 minutes later, the second covering layer of glass fiber cloth 8 is applied using the method as described above. With this method, whereby a covering glass fiber cloth is applied after spraying or brushing epoxy resin (layer 9 as shown in FIG. 2), at least two layers of glass fiber cloth are needed. After all required covering layers have been applied, about 36 hours are needed for solidification. Next, polyester (layer 10 as shown in FIG. 2) is sprayed or brushed on above the glass fiber-reinforced plastic. Approximately 20 minutes later, covering glass fiber cloth layer 11 is applied by the same method and main points similar to those for spraying or brushing epoxy resin. However, at least two layers of glass fiber cloth are to be applied, that is, another layer of glass fiber cloth 13 is applied over the polyester layer 12, and then another layer 14 of polyester is sprayed or brushed thereon. After all layers have been applied and the wrapping process is finished, about 48 hours are needed for solidification. Finally it is polished, painted and shined.

During the above-described operation all overlapping widths between glass fiber cloth are greater than 50 mm, and the ambient temperature during operation should be higher than 25° C., and the atmospheric humidity should be lower than 70%.

It has been proven by experiment that a car body made of such composite material has the advantages of high strength, light weight, long service life and low cost.

Moreover, by using this material and the method according to the invention it becomes possible to make an integral car body. Experiment shows that such a car body has a good integral construction, and is light in weight, having one-third of the weight of common steel construction, so that, gas consumption is reduced. Its strength is high so that when a collision occurs, permanent deformation of a common metal car outer cover may occur, but for a 'full plastic' car only some damage to the paint and the local impact area will result. Its cost is low. It can be seen from the foregoing description of the material and its manufacturing method, that all selected raw materials are low cost materials, the manufacturing method is simple, there is no need for great space and complicated equipment, and ordinary small firms have the capability to manufacture the composite material. This car body shows good isolation feature for sound and heat, no corrosion, easy maintenance, and high practical value.

It is also possible to use this composite material for making various boats, yachts, furniture, containers etc. Thus there is a quite wide area of application.

I claim:

1. An integral car body wherein the body is made of high strength lightweight composite material, said composite material being made by using at least one layer of glass fiber cloth soaked with epoxy resin and at least two layers of glass fiber cloth soaked with polyester to successively wrap an inner mold made of composite foam material fully with overlap.

2. The integral car body as in claim 1, wherein the composite material for making the inner foam mold is polystyrene.

3. The integral car body as in claim 1, wherein the composite material for making the inner foam mold is hard polyurethane.

4. The integral car body as in claim 1, wherein the volume weight of foam composite material used for said inner mold is about 25 kg/m$^3$.

5. The integral car body as in claim 1, wherein the thickness of foam composite material used for said inner mold is in a range of 10 to 500 mm.

6. The integral car body as in claim 5, wherein the thickness of foam composite material used for said inner mold is about 50 mm.

7. The integral car body as in claim 1, wherein the thickness of each layer of glass fiber cloth is in a range of 0.1 to 4 mm.

8. The integral car body as in claim 7, wherein the thickness of each layer of glass fiber cloth is 0.25 mm.

9. The integral car body as in claim 1, wherein the glass fiber cloth is neutral, dewaxed.

10. The integral car body as in claim 1, wherein the glass fiber cloth fully wrapping the inner mold has about 5 layers.

11. The integral car body as in claim 1, wherein there are two layers of glass fiber cloth soaked with epoxy resin and there are four layers of glass fiber cloth soaked with polyester.

* * * * *